(12) United States Patent
Kharas

(10) Patent No.: US 11,370,974 B2
(45) Date of Patent: Jun. 28, 2022

(54) HIGH ACTIVITY, HIGH GASOLINE YIELD AND LOW COKE FLUID CATALYTIC CRACKING CATALYST

(71) Applicant: BASF CORPORATION, Florham Park, NJ (US)

(72) Inventor: Karl Kharas, Iselin, NJ (US)

(73) Assignee: BASF Corporation, Florham Park, NJ (US)

( * ) Notice: Subject to any disclaimer, the term of this patent is extended or adjusted under 35 U.S.C. 154(b) by 21 days.

(21) Appl. No.: 16/604,528

(22) PCT Filed: Apr. 13, 2018

(86) PCT No.: PCT/US2018/027538
§ 371 (c)(1),
(2) Date: Oct. 10, 2019

(87) PCT Pub. No.: WO2018/191647
PCT Pub. Date: Oct. 18, 2018

(65) Prior Publication Data
US 2020/0157434 A1 May 21, 2020

Related U.S. Application Data

(60) Provisional application No. 62/485,682, filed on Apr. 14, 2017.

(51) Int. Cl.
*C10G 11/05* (2006.01)
*B01J 6/00* (2006.01)
(Continued)

(52) U.S. Cl.
CPC ............... *C10G 11/05* (2013.01); *B01J 6/001* (2013.01); *B01J 21/04* (2013.01); *B01J 23/10* (2013.01);
(Continued)

(58) Field of Classification Search
CPC .......... C10G 11/05; C10G 11/18; B01J 6/001; B01J 21/04; B01J 21/16; B01J 23/10;
(Continued)

(56) References Cited

U.S. PATENT DOCUMENTS 3,293,192 A * 12/1966 Maher ................... B01J 20/186
502/73
4,482,530 A 11/1984 Sanders et al.
(Continued)

FOREIGN PATENT DOCUMENTS

| JP | 2005532146 A | 10/2005 |
|----|--------------|---------|
| JP | 2015526279 A | 9/2015 |
| JP | 2017501870 A | 1/2017 |

OTHER PUBLICATIONS

Filho, R.W.N.D. et al. (2016) Materials Research, 19(3), 659-668.*
(Continued)

*Primary Examiner* — Brian A McCaig
(74) *Attorney, Agent, or Firm* — Lowenstein Sandler LLP

(57) ABSTRACT

A microspherical fluid catalytic cracking (FCC) catalyst includes a zeolite and alumina comprising a strong Lewis site density of less than 70 µηol/g.

18 Claims, 3 Drawing Sheets

(51) Int. Cl.
*B01J 29/08* (2006.01)
*B01J 37/08* (2006.01)
*C10G 11/18* (2006.01)
*B01J 23/10* (2006.01)
*B01J 21/04* (2006.01)
*B01J 23/18* (2006.01)

(52) U.S. Cl.
CPC ............. *B01J 23/18* (2013.01); *B01J 29/084* (2013.01); *B01J 37/08* (2013.01); *C10G 11/18* (2013.01)

(58) Field of Classification Search
CPC ...... B01J 23/18; B01J 29/084; B01J 35/1019; B01J 37/08
See application file for complete search history.

(56) References Cited

U.S. PATENT DOCUMENTS

| | | | | |
|---|---|---|---|---|
| 4,493,902 | A | * | 1/1985 | Brown .................. C10G 11/05 502/65 |
| 5,023,220 | A | | 6/1991 | Dight et al. |
| 5,070,053 | A | * | 12/1991 | Culross .................. B01J 21/12 502/64 |
| 5,559,067 | A | | 9/1996 | Lerner et al. |
| 6,069,012 | A | | 5/2000 | Kayser |
| 6,319,393 | B1 | | 11/2001 | Macedo |
| 6,555,496 | B1 | | 4/2003 | Stamires et al. |
| 6,656,347 | B2 | * | 12/2003 | Stockwell ............... B01J 21/16 208/120.01 |
| 6,673,235 | B2 | | 1/2004 | Harris et al. |
| 6,716,338 | B2 | | 4/2004 | Madon et al. |
| 6,942,784 | B2 | | 9/2005 | Stockwell et al. |
| 9,630,171 | B2 | | 4/2017 | Long et al. |
| 2002/0115556 | A1 | | 8/2002 | Stockwell et al. |
| 2003/0089640 | A1 | | 5/2003 | Madon et al. |
| 2006/0096891 | A1 | | 5/2006 | Stamires et al. |
| 2007/0060780 | A1 | * | 3/2007 | Stamires ................. B01J 29/80 585/653 |
| 2007/0098611 | A1 | | 5/2007 | Yang |
| 2008/0146436 | A1 | * | 6/2008 | Van ........................ C10G 11/05 502/68 |
| 2008/0268395 | A1 | | 10/2008 | Lahmostov et al. |
| 2015/0174559 | A1 | | 6/2015 | Smith et al. |

OTHER PUBLICATIONS

Rui Feng et al., Preparation and Characterization of y—Al 2 O 3 with Rich Bronsted Acid Sites and its Application in the Fluid Catalytic Cracking Process, Journal of Physical Chemistry C, vol. 118, No. 12, Mar. 27, 2014, 9 pages.

European Search Report for EP18784591.2 dated Nov. 5, 2020, 7 pages.

Christoph et al., "The Crystal Structure of Boehmite," Clays and Clay Minerals, vol. 27, No. 2, pp. 81-86 (1979).

International Search Report and Written Opinion in International Application No. PCT/US2018/027538, dated Aug. 2, 2018 (15 pages).

Shefer et al., "Features of the Real Structure of Pseudoboehmites: Violations of the Structure and Layer Packing Caused By Crystallization Water," Journal of Structural Chemistry. Vol. 51, No. 1, pp. 132-141 (2010).

Cerqueira, et al., "Multitechnique Characterization of Coke Produced during Commercial Resid FCC Operation," Ind Eng. Chem. Res. 2005, 44, 2069-2077, American Chemical Society.

Deeba, Michael, et al., "The Measurement of Catalyst Acidity II: Chemisorption Studies," Zeitschrift fur Pysikalische Chemie Neue Folge, Bd., 1985, 144 S. 85-103, Munchen.

Gorte, R.J., "What do we know about the acidity of solid acids?" Catalysis Letters, 1999, 62, 1-13, J.C. Baltzer AG, Science Publishers.

Parry, E.P., "An Infrared Study of Pyridine Adsorbed on Acidic Solids. Characterization of Surface Acidity," Journal of Catalysts, 1963, 2, 371-379, Union Research Center, California.

Thibault-Starzyk, et al., "In situ thermogravimetry in an infrared spectrometer: an answer to quantitative spectroscopy of adsorbed species on heterogeneous catalysts," Microporous and Mesoporous Materials, 2004, 67, 107-112, Elsevier.

Japanese Office Action for Japanese Patent Application No. 2019-555909, dated Mar. 15, 2022, 3 pages.

Japanese Examination Report for Japanese Patent Application No. 2019-555909, dated Feb. 7, 2022, 16 pages.

* cited by examiner

HIGH ACTIVITY, HIGH GASOLINE YIELD AND LOW COKE FLUID CATALYTIC CRACKING CATALYST

CROSS-REFERENCE TO RELATED APPLICATIONS

The present application is a U.S. National Phase Application under 35 U.S.C. § 371 of International Application No. PCT/US2018/027538, filed on Apr. 13, 2018, which claims the benefit of priority to U.S. Provisional Application No. 62/485,682, filed on Apr. 14, 2017, of which the contents of each are incorporated herein in their entirety.

FIELD

The present technology is generally related to petroleum refining catalysts. More specifically, the technology is related to microspherical fluid catalytic cracking (FCC) catalysts including zeolite, and methods of preparing and using such catalysts.

BACKGROUND

Catalytic cracking is a petroleum refining process that is applied commercially on a very large scale. Catalytic cracking, and particularly fluid catalytic cracking (FCC), is routinely used to convert heavy hydrocarbon feedstocks to lighter products, such as gasoline and distillate range fractions. In FCC processes, a hydrocarbon feedstock is injected into the riser section of a FCC unit, where the feedstock is cracked into lighter, more valuable products upon contacting hot catalyst circulated to the riser-reactor from a catalyst regenerator.

Excessive coke and hydrogen are undesirable in commercial catalytic cracking processes. Even small increases in the yields of these products relative to the yield of gasoline can cause significant practical problems. For example, increases in the amount of coke produced can cause undesirable increases in the heat that is generated by burning off the coke during the highly exothermic regeneration of the catalyst. Conversely, insufficient coke production can also distort the heat balance of the cracking process. In addition, in commercial refineries, expensive compressors are used to handle high volume gases, such as hydrogen. Increases in the volume of hydrogen produced, therefore, can add substantially to the capital expense of the refinery.

Since the 1960s, most commercial fluid catalytic cracking catalysts have contained zeolites as an active component. Such catalysts have taken the form of small particles, called microspheres, containing both an active zeolite component and a non-zeolite component in the form of a high alumina, silica-alumina (aluminosilicate) matrix. The active zeolitic component is incorporated into the microspheres of the catalyst by one of general techniques known in the art, such as those in U.S. Pat. No. 4,482,530, or U.S. Pat. No. 4,493,902.

It is believed that the alumina serves to provide sites for cracking gasoil and resid feeds. While moderate amounts of Lewis acidity are desired, strong Lewis and Brønsted sites tend to produce coke. Coke, while needed in order to operate FCC units, is usually produced in larger than optimal amounts in FCC catalysis. Thus, reductions in coke selectivity are desirable.

SUMMARY

In one aspect, a microspherical fluid catalytic cracking (FCC) catalyst is provided. The catalyst includes a zeolite and an alumina comprising a strong Lewis site density of less than 70 µmol/g. In some embodiments, the alumina is derived from flash calcined gibbsite. In some embodiments, the FCC catalyst includes about 10 wt % to about 60 wt % alumina derived from flash calcined gibbsite. In some embodiments, the flash calcined gibbsite is hydrated flash calcined gibbsite.

The alumina or the FCC catalyst may further include a rare earth element, an alkaline earth element, or a mixture of any two or more thereof. In some embodiments, the rare earth element is ytterbium, neodymium, samarium, gadolinium, cerium, lanthanum, or a mixture of any two or more thereof. In some embodiments the rare earth element may include a lanthanide or yttrium. In some embodiments, the alkaline earth metal is barium, strontium, calcium, magnesium, or a mixture of any two or more thereof. In some embodiments, the alumina includes the rare earth or alkaline earth elements in an amount of about 0.1 wt % to about 12 wt %.

In some embodiments, the FCC catalyst further includes about 5% to about 40 wt % mullite.

In some embodiments of the present technology, the catalyst has a phase composition including at least 60 wt % zeolite. In some embodiments, the catalyst has a phase composition including at least about 30 wt % Y-zeolite, at least about 40 wt % Y-zeolite, or at least about 60 wt % Y-zeolite.

In some embodiments of the present technology, the catalyst has a phase composition that further includes at least about 30 wt % amorphous material.

In some embodiments, the zeolite is Y-zeolite and where it is crystallized as a layer on the surface of a matrix, wherein the matrix includes alumina derived from flash calcined gibbsite.

In some embodiments of the present technology, the catalyst has a matrix derived from a kaolin calcined through its characteristic exotherm.

In some embodiments of the present technology, the Y-zeolite is ion-exchanged to reduce the sodium content of said catalyst to less than 0.7% by weight Na₂O, or less than 0.5% by weight Na₂O.

In one aspect, a method of making a zeolitic fluid catalytic cracking catalyst that includes pre-forming a precursor microsphere that includes a non-zeolitic material and alumina comprising a Lewis site density of less than 70 µmol/g, and in situ crystallizing a zeolite on the pre-formed microsphere to provide the zeolitic microsphere material.

In one aspect, a method of cracking a hydrocarbon feed includes contacting said feed with a catalytic cracking catalyst including a microspherical fluid catalytic cracking (FCC) catalyst including a Y zeolite and an alumina comprising a strong Lewis site density of less than 70 µmol/g.

In one aspect, an alumina that includes a strong Lewis site density of less than 70 µmol/g. In some embodiments, the alumina is derived from flash calcined gibbsite.

DETAILED DESCRIPTION

Figure 1:
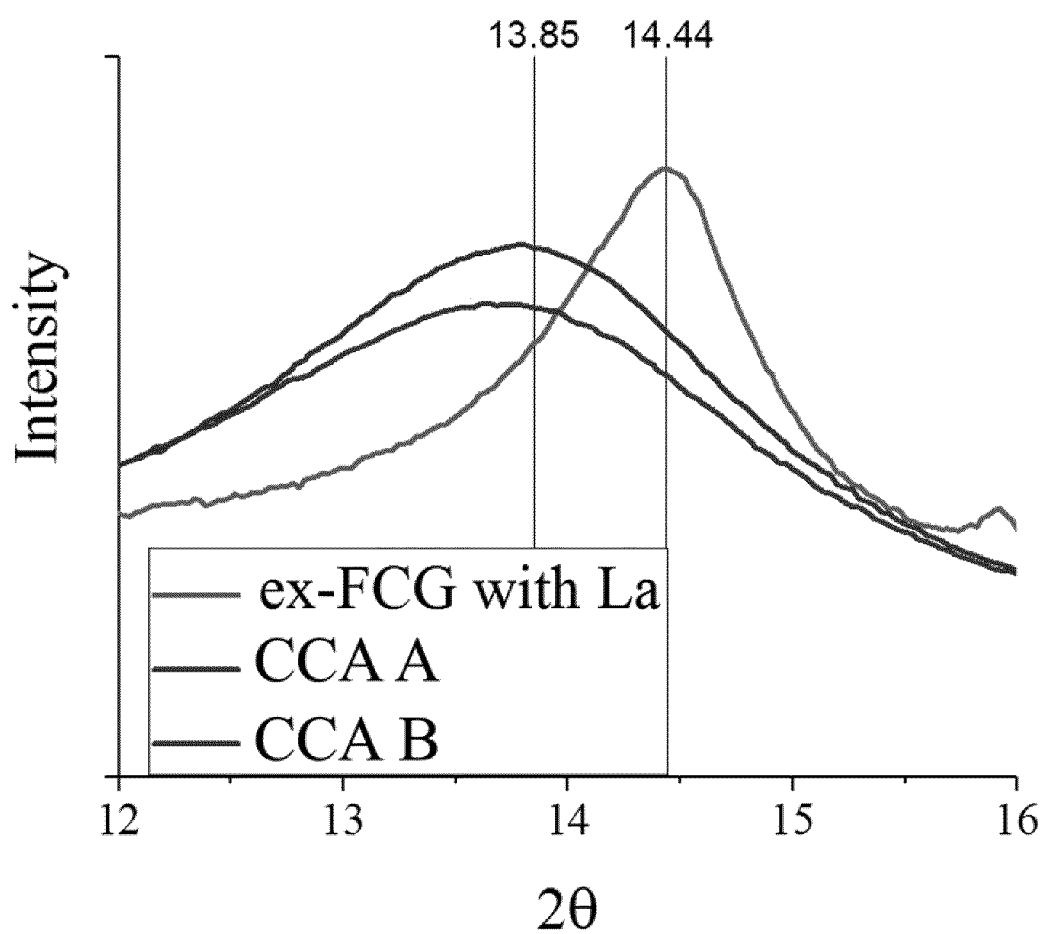
FIG. 1 illustrates the X-ray diffraction 020 reflection of fine crystalline boehmite derived from hydrated flash calcined gibbsite and pseudoboehmites Comparative Commercial Alumina (CCA) A and CCA B.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In one aspect, a microspherical fluid catalytic cracking (FCC) catalyst that includes a Y zeolite and an alumina that has a strong Lewis site density of less than about 70 µmol/g. Suitable strong Lewis site densities include, but are not limited to, less than about 70 µmol/g, less than about 65 µmol/g, less than about 60 µmol/g, less than about 55 µmol/g, less than about 50 µmol/g, less than about 45 µmol/g, less than about 40 µmol/g, or any range including and/or in between any two of these values.

In some embodiments, the catalyst includes alumina derived from flash calcined gibbsite.

In some embodiments, the catalyst includes about 10 wt % to about 60 wt % alumina derived from flash calcined gibbsite. In some embodiments, the catalyst includes about 10 wt % to about 40 wt % alumina derived from flash calcined gibbsite.

In some embodiments, the alumina is derived from flash calcined gibbsite. For example, in any embodiment herein, the catalyst includes alumina that is formed from boehmite, bayerite, or a mixture thereof. In some embodiments, the alumina is formed from fine crystalline boehmite. In some embodiments, the alumina is formed from bayerite. In some embodiments, the alumina includes gamma alumina. In some embodiments, the boehmite, bayerite, or mixture thereof is derived from flash calcined gibbsite. In some embodiments, the flash calcined gibbsite is hydrated flash calcined gibbsite. In some embodiments, the boehmite, bayerite, or mixture thereof may further include a rare earth element, bismuth, and alkaline earth element, or a mixture of two or more thereof.

Fine crystalline boehmite is known to have a high surface area and high porosity. Fine crystalline boehmite generally has a different crystalline structure than pseudoboehmite, which is observed as a difference in the position of the lead 020 reflection in the X-ray diffraction pattern. While anhydrous flash calcined gibbsite may be hydrated to create a fine crystalline boehmite using gentle methods known in the art, such methods yield mixtures of boehmite, pseudoboehmite, and bayerite. The present technology yields pure boehmite formed from hydrated flash calcined gibbsite, where the flash calcined gibbsite has a water content of at least about 2.5 wt % to about 10 wt % prior to hydration.

In some embodiments, the fine crystalline boehmite may be made by hydration of flash calcined gibbsite having a water content of about 2.5 wt % to about 10 wt % in warm water at atmospheric conditions or in hot water in an autoclave. In some embodiments, the temperature of the water is greater than 100° C. In general, the boehmite crystallite size may be controlled by the temperature of the water. In addition, in warm water the crystallite size of fine crystalline boehmite can be controlled through variation of solid content, pH, and the presence of different sorts of mineralizing agents, which may be acetates, ammonium carbonate, sugars, or other commonly known mineralizing agents. In some embodiments, the temperature of the water is from about 80 to about 99° C.

In some embodiments, the fine crystalline boehmite may be made by hydration of flash calcined gibbsite in warm water doped with salts of lanthanum, strontium, or bismuth at atmospheric conditions. Suitable salts of lanthanum, strontium, or bismuth may include, but are not limited to, nitrate salts, acetate salts, halide salts, citrate salts, or mixtures of two or more thereof. In some embodiments, the fine crystalline boehmite may be made by hydration of flash calcined gibbsite in warm water doped with lanthanum nitrate, lanthanum acetate, or a mixture thereof. In some embodiments, the temperature of the water doped with salts of lanthanum, strontium, or bismuth is about 100° C. Suitable temperatures include, but are not limited to, from about 50° C. to about 100° C., about 60° C. to about 100° C., about 80° C. to about 100° C., about 90° C. to about 100° C., and any ranges including and/or between any two of these values. In some embodiments, the temperature includes from about 80° C. to about 99° C.

The alumina may further include a rare earth, bismuth, alkaline earth, or a mixture of any two or more such elements. For example, the alumina may include rare earth elements. In particular embodiments, the rare earth element may be ytterbium, gadolinium, cerium, lanthanum, or a mixture of any two or more thereof. In particular embodiments, the rare earth element is lanthanum. In some embodiments, the rare earth, bismuth, or alkaline earth elements are present in an amount of about 0.1 wt % to about 12 wt %. In some embodiments, the rare earth, bismuth, or alkaline earth elements are present in an amount of about 1 wt % to about 10 wt %. In a particular embodiment, the alumina includes about 1% to about 5% lanthanum. In a particular embodiment, the alumina includes about 1% to about 3% lanthanum.

In some embodiments, the alumina includes alkaline earth metals. In further embodiments, the alkaline earth metal is at least one of barium, strontium, calcium, or magnesium, or a mixture of any two or more thereof. In particular embodiments, the alkaline earth metal is barium.

In some embodiments, the FCC catalyst of the present technology may further include mullite. In some embodiments, the FCC catalyst may include about 5% to about 40 wt % mullite. In some embodiments, the phase composition further includes at least about 20 wt % mullite.

The FCC catalyst may have a phase composition including zeolite, mullite, and amorphous material. The FCC catalyst may have a phase composition including Y-zeolite, mullite, and amorphous material.

In some embodiments, the FCC catalyst has a phase composition including at least 35 wt % zeolite. In some embodiments, the FCC catalyst has a phase composition including at least 60 wt % zeolite. Suitable zeolites include, but are not limited to, zeolite X, Y-zeolite, ZSM-5, beta zeolite, ZSM-11, ZSM-14, ZSM-17, ZSM-18, ZSM-20, ZSM-31, ZSM-34, ZSM-41, ZSM-46, mordenite, chabazite, or mixtures of two or more thereof. In some embodiments, the FCC catalyst has a phase composition that includes Y-zeolite.

In some embodiments, the FCC catalyst of the present technology has a phase composition that includes at least about 10 wt % Y-zeolite, at least about 15 wt % Y-zeolite, at least about 20 wt % Y-zeolite, at least about 25 wt % Y-zeolite, or at least about 30 wt % Y-zeolite. In some embodiments, the catalyst has a phase composition that includes about 10 wt % to about 25 wt % Y-zeolite. In some embodiments, the catalyst has a phase composition that includes at least about 40 wt % Y-zeolite. In particular embodiments, the catalyst has a phase composition that includes at least about 60 wt % Y-zeolite. In particular embodiments, the catalyst has a phase composition that includes at least about 65 wt % Y-zeolite.

In some embodiments, the zeolite is Y-zeolite and is crystallized as a layer on the surface of a matrix. In some embodiments, the matrix includes alumina that includes flash calcined gibbsite. In some embodiments, the matrix further includes kaolin calcined through its characteristic exotherm.

The FCC catalyst has a phase composition that may also include an amorphous material. Illustrative amorphous materials include, but are not limited to, silica-alumina. In further embodiments, the amorphous material may be derived from the disintegration of crystalline zeolite. In still further embodiments, the amorphous material may be derived from the disintegration of crystalline Y-zeolite.

In some embodiments, the FCC catalyst of the present technology has a phase composition that includes at least about 30 wt % amorphous material. In some embodiments, the FCC catalyst has a phase composition that includes at least about 65 wt % amorphous material.

In one aspect, the zeolite in the fluid catalytic cracking catalyst of the present technology is Y-zeolite and is ion-exchanged to reduce the sodium content of said catalyst to less than 0.7% by weight $Na_2O$. In some embodiments, the sodium content of said catalyst is less than 0.5% by weight $Na_2O$. In some embodiments, the ion-exchange is conducted one, two, three, four, five, or six times. In some embodiments, the ion-exchange is conduced sufficient number of times such that the sodium content of said catalyst is less than 0.5% by weight $Na_2O$.

In some embodiments, the FCC catalyst includes an alkali metal ion-exchanged zeolite. In some embodiments, the FCC catalyst includes a rare earth-exchanged zeolite. In some embodiments, the FCC catalyst includes a lanthanum-exchanged zeolite. In some embodiments, the FCC catalyst includes a lanthanum-exchanged zeolite crystallized in-situ in a porous kaolin matrix.

In some embodiments, the zeolite has a unit cell parameter of less than or equal to 24.70 Å. In some embodiments, the zeolite has a unit cell parameter of less than or equal to 24.60 Å. In some embodiments, the zeolite has a unit cell parameter of less than or equal to 24.55 Å. In some embodiments, the zeolite has a unit cell parameter of from about 24.10 Å to about 24.70 Å. In some embodiments, the zeolite has a unit cell parameter of from about 24.10 Å to about 24.65 Å. In some embodiments, the zeolite has a unit cell parameter of from about 24.10 Å to about 24.60 Å. In some embodiments, the zeolite has a unit cell parameter of from about 24.10 Å to about 24.55 Å. In some embodiments, the zeolite has a unit cell parameter of from about 24.10 Å to about 24.54 Å. In some embodiments, the zeolite has a unit cell parameter of from about 24.10 Å to about 24.53 Å. In some embodiments, the zeolite has a unit cell parameter of from about 24.10 Å to about 24.52 Å. In some embodiments, the zeolite has a unit cell parameter of from about 24.10 Å to about 24.51 Å. In some embodiments, the zeolite has a unit cell parameter of from about 24.20 Å to about 24.55 Å. In some embodiments, the zeolite has a unit cell parameter of from about 24.20 Å to about 24.54 Å. In some embodiments, the zeolite has a unit cell parameter of from about 24.20 Å to about 24.53 Å. In some embodiments, the zeolite has a unit cell parameter of from about 24.20 Å to about 24.52 Å. In some embodiments, the zeolite has a unit cell parameter of from about 24.20 Å to about 24.51 Å. In some embodiments, the zeolite has a unit cell parameter of from about 24.30 Å to about 24.55 Å. In some embodiments, the zeolite has a unit cell parameter of from about 24.30 Å to about 24.54 Å. In some embodiments, the zeolite has a unit cell parameter of from about 24.30 Å to about 24.53 Å. In some embodiments, the zeolite has a unit cell parameter of from about 24.30 Å to about 24.52 Å. In some embodiments, the zeolite has a unit cell parameter of from about 24.30 Å to about 24.51 Å. In some embodiments, the zeolite has a unit cell parameter of from about 24.40 Å to about 24.55 Å. In some embodiments, the zeolite has a unit cell parameter of from about 24.40 Å to about 24.54 Å. In some embodiments, the zeolite has a unit cell parameter of from about 24.40 Å to about 24.53 Å. In some embodiments, the zeolite has a unit cell parameter of from about 24.40 Å to about 24.52 Å. In some embodiments, the zeolite has a unit cell parameter of from about 24.40 Å to about 24.51 Å. In some embodiments, the zeolite has a unit cell parameter of from about 24.45 Å to about 24.55 Å. In some embodiments, the zeolite has a unit cell parameter of from about 24.45 Å to about 24.54 Å. In some embodiments, the zeolite has a unit cell parameter of from about 24.45 Å to about 24.53 Å. In some embodiments, the zeolite has a unit cell parameter of from about 24.45 Å to about 24.52 Å. In some embodiments, the zeolite has a unit cell parameter of from about 24.45 Å to about 24.51 Å. In some embodiments, the zeolite has a unit cell parameter of about 24.10, 24.11, 24. 12, 24.13, 24.14, 24.15, 24.16, 24.17, 24.18, 24.19, 24.20, 24.21, 24.22, 24.23, 24.24, 24.25, 24.26, 24.27, 24.28, 24.29, 24.30, 24.31, 24.32. 24.33, 24.34, 24.35, 24.36, 24.37, 24.38, 24.39, 24.40, 24.41, 24.42, 24.43, 24.44, 24.45, 24.46, 24.47, 24.48, 24.49, 24.50, 24.51, 24.52, 24.53, 24.54, 24.55, 24. 56, 24.57, 24.58, 24.59, 24.60, 24.61, 24.62, 24.63, 24.64, 24.65, 24.66, 24.67, 24.68, 24.69, or 24.70 Å.

The FCC catalyst average particle size may be from about 60 to about 100 micrometers. In some embodiments, the FCC catalyst has an average particle size of about 60 to about 90 micrometers. In some embodiments, the FCC catalyst has an average particle size of about 60 to about 80 micrometers.

In one aspect, methods of making the FCC catalysts described herein. In general, the active zeolitic component may be incorporated into the microspheres of the catalyst by one of two general techniques. In one technique, the zeolitic component is crystallized and then incorporated into microspheres in a separate step. In the second technique, the in-situ technique, microspheres are first formed and the zeolitic component is then crystallized in the microspheres themselves to provide microspheres containing both zeolitic and non-zeolitic components.

In some embodiments, the method of making a zeolitic fluid catalytic cracking catalyst includes:
 pre-forming precursor microspheres that include a non-zeolitic material and alumina having a strong Lewis site density of less than about 70 µmol/g; and
 in situ crystallizing a zeolite on the precursor microsphere to provide the zeolitic microsphere material.

In some embodiments, the alumina is derived from flash calcined gibbsite as described herein in any embodiment.

In some embodiments, the in situ crystallizing further includes:
 mixing the precursor microspheres with sodium silicate, sodium hydroxide and water to obtain an alkaline slurry; and
 heating the alkaline slurry to a temperature and for a time sufficient to crystallize at least about 15% by weight Y-zeolite in the microspheres.

In some embodiments, the zeolitic microspheric material may be isolated or separated from the crystallization liquor after contacting. The isolation may be carried out by commonly used methods such as filtration. In further embodiments, the zeolitic microspheric material may be washed or contacted with water or other suitable liquid to remove residual crystallization liquor.

In some embodiments, the method may further include mixing the zeolitic microspheric material with an ammonium solution prior to or subsequent to contacting with the crystallization liquor, wherein the zeolitic microspheric material includes Y-zeolite in the sodium form prior to the mixing with the ammonium solution. In some embodiments, the mixing with the ammonium solution is conducted at acidic pH conditions. In some embodiments, the mixing with the ammonium solution is conducted at pH of about 3 to about 3.5. In some embodiments, the mixing with the ammonium solution is conducted at a temperature above room temperature. In some embodiments, the mixing with the ammonium solution is conducted at a temperature of at least about 80° C. to about 100° C., including increments therein.

In some embodiments, the ammonium exchanged microspheric material is further ion exchanged with a rare earth ion solution. In some embodiments, the rare earth ion are nitrates of ytterbium, neodymium, samarium, gadolinium, cerium, lanthanum, or a mixture of any two or more such nitrates. In some embodiments, the rare earth ions are derived from the lanthanides or yttrium. In some embodiments, the microspheres are contacted with solutions of lanthanum nitrate or yttrium nitrate. In particular embodiments, the microspheres are contacted with solutions of lanthanum nitrate. In one or more embodiments, the ion exchange step or steps are carried out so that the resulting catalyst contains less than about 0.2%, by weight $Na_2O$. After ion exchange, the microspheres are dried. Rare earth levels in the range of 0.1% to 12% by weight, specifically 1-5% by weight, and more specifically 2-3% by weight are contemplated. In certain embodiments, the amount of rare earth added to the catalyst as a rare earth oxide will range from about 1 to 5%, typically 2-3 wt % rare earth oxide (REO).

In some embodiments, the FCC catalyst is further calcined. In some embodiments, the calcining is conducted for at least about two hours.

In some embodiments, the calcining is conducted at a temperature of from about 500° C. to about 750° C. In some embodiments, the calcining is conducted in the presence of about 25% v/v steam.

In some embodiments, the method may further include conducted an additional sodium exchange of the microspheres with ammonium. The second or additional sodium exchange may be carried out in the same manner as for the first sodium exchange. In some embodiments, the method may further include additional sodium exchanges in order to reduce the sodium content of the FCC catalyst is less than 0.5% by weight $Na_2O$.

The method may further include calcining the ammoniated material to form a second calcined material. In some embodiments, calcining the ammoniated material is conducted for at least about 15 minutes. In some embodiments, calcining the ammoniated material is conducted for at least about two hours. In some embodiments, calcining the ammoniated material is conducted for about one to about two hours. In some embodiments, calcining the ammoniated material is conducted at a temperature of from about 500° C. to about 700° C. In some embodiments, the calcining is conducted in the presence of about 25% v/v steam.

The method further include steam-treating the FCC catalyst. In some embodiments, the steam-treating is performed on the second calcined material. In some embodiments, the steam-treating conducted at a temperature of at least about 700° C. In some embodiments, the steam-treating is conducted for at least about four hours. In some embodiments, the steam-treating is conducted for about one to about 24 hours. In some embodiments, the final step is conducted in a rotary calciner.

In another aspect, disclosed herein are microspherical FCC catalysts as prepared by any of the methods disclosed herein.

The zeolite may be incorporated into an amorphous binder that includes flash calcined gibbsite. In some embodiments, the flash calcined gibbsite is hydrated flash calcined gibbsite. In some embodiments, the hydrated flash calcined gibbsite includes fine crystalline boehmite. In some embodiments, the hydrated flash calcined gibbsite includes bayerite. In further embodiments, the hydrated flash calcined gibbsite upon calcination includes gamma-alumina. Additional suitable binders include, but are not limited to, silica, silica-alumina, clay (e.g., kaolin) or other known inorganic binders. In some embodiments, a transitional alumina, such as $γ-Al_2O_3$, $η-Al_2O_3$, $δ-Al_2O_3$, $θ-Al_2O_3$, $κ-Al_2O_3$ or any combination thereof, is included in the composition. In some embodiments, a slurry containing zeolite and one or more binders is made and spray-dried to yield microspheres whose average particle size is from about 60 to about 100 micrometers. In some embodiments, the slurry further contains clay. In some embodiments, the transitional alumina does not include $κ-Al_2O_3$.

The Y-zeolite may be produced into high zeolite content microspheres by the in-situ procedure described in U.S. Pat. No. 4,493,902 ("the '902 Patent"). The '902 Patent discloses FCC catalysts including attrition-resistant, high zeolitic content, catalytically active microspheres containing more than about 40%, preferably 50-70% by weight Y faujasite and methods for making such catalysts by crystallizing more than about 40% sodium Y-zeolite in porous microspheres composed of a mixture of metakaolin (kaolin calcined to undergo a strong endothermic reaction associated with dehydroxylation) and kaolin calcined under conditions more severe than those used to convert kaolin to metakaolin, i.e., kaolin calcined to undergo the characteristic kaolin exothermic reaction, sometimes referred to as the spinel form of calcined kaolin. The microspheres containing the two forms of calcined kaolin could also be immersed in an alkaline sodium silicate solution, which is heated, preferably until the maximum obtainable amount of Y faujasite is crystallized in the microspheres. The microspheres are separated from the sodium silicate mother liquor, ion-exchanged with rare earth, ammonium ions or both to form rare earth or various known stabilized forms of catalysts.

In accordance with the present technology, flash calcined gibbsite or hydrated flash calcined gibbsite may be used instead of at least a part of the alumina.

In general, the zeolitic microspheric material is separated from the crystallization liquor after completion of crystallization.

The Y-zeolite may also be produced as zeolite microspheres, which are disclosed in U.S. Pat. No. 6,656,347 ("the '347 Patent") and U.S. Pat. No. 6,942,784 ("the '784 Patent"). These zeolite microspheres are macroporous, have sufficient levels of zeolite to be very active and are of a unique morphology to achieve effective conversion of hydrocarbons to cracked gasoline products with improved bottoms cracking under short contact time FCC processing. These zeolite microspheres are produced by a modification of technology described in the '902 Patent.

In another aspect, an alumina is provided, where the alumina includes a strong Lewis site density of less than about 70 μmol/g. Suitable strong Lewis site densities include, but are not limited to, less than about 70 μmol/g, less than about 65 μmol/g, less than about 60 μmol/g, less than about 55 μmol/g, less than about 50 μmol/g, less than about 45 μmol/g, less than about 40 μmol/g, or any range including and/or in between any two of these values. In some embodiments, the alumina is gamma-alumina.

In some embodiments, the alumina may be derived from flash calcined gibbsite as described herein in any embodiment. In some embodiments, the catalyst includes alumina that is formed from boehmite, bayerite, or a mixture thereof. In some embodiments, the alumina is formed from fine crystalline boehmite. In some embodiments, the alumina is formed from bayerite. In some embodiments, the alumina includes gamma alumina. In some embodiments, the boehmite, bayerite, or mixture thereof is derived from flash calcined gibbsite. In some embodiments, the flash calcined gibbsite is hydrated flash calcined gibbsite. In some embodiments, the boehmite, bayerite, or mixture thereof may further include a rare earth element, bismuth, an alkaline earth element, or mixture of two or more thereof.

Methods of Use

Without being bound by theory, it is believed that FCC catalysts containing alumina comprising a strong Lewis site density of less than about 70 μmol/g may demonstrate improvements in bottoms selectivity. Rare earth or alkaline earth doped aluminas should demonstrate greater improvements. "Bottoms" refers to the heaviest fraction of cracked gasoil, also known as heavy cycle oil (HCO), and has very little value. LCO (light cycle oil) is much more valuable since, with further refining, LCO is transformed into diesel fuel. Catalysts that maximize LCO/bottoms ratio as a function of conversion (conversion in FCC is typically defined as 100-LCO-bottoms) are therefore desired.

In another aspect, methods to produce gasoline in an FCC system are provided, where the methods include using an FCC catalyst as described herein.

In another aspect, methods to improve gasoline yield in an FCC system are provided, where the methods include using an FCC catalyst as described herein.

In another aspect, methods to improve gasoline selectivity in an FCC system are provided, wherein the methods include using an FCC catalyst as described herein.

Without being bound by theory, it is believed that use of the FCC catalysts according to the present technology can yield improved selectivities in the FCC process, such as lower coke yield, more olefinic liquids and LPG, and higher ratio of LCO/bottoms.

The present invention, thus generally described, will be understood more readily by reference to the following examples, which are provided by way of illustration and are not intended to be limiting of the present invention.

EXAMPLES

Example 1: Preparation of Boehmite from Non-Doped and Doped Flash Calcined Gibbsite Example 1A: Hydrated flash calcined gibbsite (non-doped). 160 g flash calcined gibbsite that contains between 2.5 and 10 wt % water that desorbs at temperatures below 250° C. was added to 800 g of deionized water and heated to 50° C. If flash calcined gibbsite contains less than about 2.5 wt % water that desorbs at temperatures less than 250° C., then it should first be subjected to humid atmosphere to raise its water content that desorbs at temperatures less than 250° C. to between 2.5 and 10 wt %. The temperature was first raised to 90° C., and sodium carbonate was added to raise the pH to 9.0. The mixture was held for a period of 24 h at 99° C. The mixture was filtered, washed to remove sodium salts, and dried. Fine crystallized boehmite was obtained having an average crystallite size of 92 Å and a BET surface area of about 308 m$^2$/g.

Example 1B: Hydrated flash calcined gibbsite (doped). Lanthanum acetate, lanthanum nitrate, strontium acetate, or bismuth citrate was dissolved in 800 g of deionized water in a 1 L Pyrex vessel equipped with an overhead stirring paddle. The solution was heated to 50° C., and 160 g of flash calcined gibbsite was then added. The temperature was increased 90° C., and the pH was adjusted to about 9.0 with sodium carbonate. The boehmite was allowed to crystallize for 24 h. Following crystallization, the reaction mixture was cooled, filtered, washed with deionized water to remove sodium salts, and dried. The resultant sample was analyzed via X-ray diffraction to determine phase composition and to estimate boehmite crystallite size along the 120 direction. Table 1 provides the physicochemical properties for boehmites doped following the procedure described above.

TABLE 1

Physicochemical properties for doped boehmites.

| | Lanthanum Nitrate | | | | |
|---|---|---|---|---|---|
| Target wt % La$_2$O$_3$ | 2 | 4 | 4 | 6 | 8 |
| pH of hydration | 9 | 5 | 9 | 9 | 9 |
| BET (TSA), m$^2$/g | 229 | 361 | 242 | 287 | 289 |
| T-plot (MSA), m$^2$/g | 214 | 363 | 217 | 272 | 275 |

TABLE 1-continued

Physicochemical properties for doped boehmites.

| 120 crystallite size (Å) | 92 | 65 | 107 | 97 | 92 |
|---|---|---|---|---|---|
| La found/La target | 0.99 | 0.72 | 0.94 | 0.97 | 0.94 |
| Lanthanum Acetate | | | | | |
| Target wt % $La_2CO_3$ | 2 | 4 | 4 | 6 | 8 |
| pH of hydration | 9 | 6 | 9 | 9 | 9 |
| BET (TSA), $m^2/g$ | 273 | 374 | 281 | 244 | 286 |
| T-plot (MSA), $m^2/g$ | 261 | 405 | 257 | 215 | 269 |
| 120 crystallite size (Å) | 123 | 64 | 84 | 101 | 81 |
| La found/La target | 0.97 | 0.74 | 0.82 | 0.86 | 0.95 |
| Strontium Acetate | | | | | |
| Target wt % SrO | 2 | 4 | 6 | 8 | |
| BET (TSA), $m^2/g$ | 179 | 199 | 165 | 188 | |
| T-plot (MSA), $m^2/g$ | 158 | 181 | 145 | 175 | |
| 120 crystallite size (Å) | 147 | 141 | 151 | 138 | |
| Sr found/Sr target | 0.98 | 1.00 | 0.98 | 1.00 | |
| Bismuth Citrate | | | | | |
| Target wt % $Bi_2O_3$ | 2 | 4 | 4 | 6 | |
| pH of hydration | 9 | 9 | 8.3 | 8.3 | |
| BET (TSA), $m^2/g$ | 354 | 337 | 375 | 400 | |
| T-plot (MSA), $m^2/g$ | 372 | 305 | 387 | 415 | |
| 120 crystallite size (Å) | 80 | 48 | 53 | 48 | |
| Bi found/Bi target | 0.77 | 0.73 | 0.73 | 0.89 | |

Example 1C: 50° C. vs 99° C. Boehmite growth with lanthanum nitrate. 15.41 g of lanthanum nitrate hexahydrate was dissolved in 800 g of deionized water in four separate samples (Samples 1-4). The mixture was heated to 50° C. and 160 g flash calcined gibbsite was added. Samples 1 and 2 were maintained at this temperature and evaluated at 5 h and 24 h. Sample 1 was maintained at a pH of 6.7, while Sample 2 was adjusted to a pH of 9.1 using 9.63 g of $Na_2CO_3$. For Samples 3 and 4, the temperature was increased to 99° C. after flash calcined gibbsite addition to the 50° C. lanthanum nitrate solution. For Sample 3 was maintained at a pH of 5.6. Without being bound by theory, the variation in pH may be due to a decrease in the $K_w$ (self-ionization constant of water) with temperature and different carbonate demands at 50° C. vs 99° C. For Sample 4, the temperature was first raised to 90° C. and 13.55 g sodium carbonate was added to raise the pH to 9.0. Boehmite crystallite size for Samples 3 and 4 were measured after 1, 2, 4, 6, and 24 h hydration time at 99° C. For all samples, fine crystalline boehmite is observed in the X-ray diffraction pattern of these products of flash calcined gibbsite hydration. The maximum of the 020 reflection occurs at 14.40-14.44° 2θ.[3]

Example 1D: Evaluation of lanthanum acetate doped hydrated flash calcined gibbsite. Flash calcined gibbsite was hydrated with lanthanum acetate following the procedure described in Example 1C and evaluated via X-ray diffraction. FIG. 1 shows portions of X-ray diffraction patterns collected using Cu radiation for the pseudoboehmites CCA A and CCA B and boehmites prepared from flash calcined gibbsite hydrated with lanthanum acetate (ex-FCG with La). The ex-FCG with La boehmite of the present technology exhibited a maximum intensity at 14.44° 2θ, which is considered a fine crystalline boehmite.[4] The lead 020 reflection for boehmites occurs near 14.48° 2θ when one uses Cu-radiation while the corresponding reflection for pseudoboehmite occurs at lower angle, typically less than 14° 2θ.

Example 1E: Formation of gamma aluminas. Boehmite materials were made Examples 1A to 1D are converted to γ-$Al_2O_3$ (gamma alumina) by calcination at temperatures sufficient to dehydrate boehmite (AlOOH) to $Al_2O_3$. Calcination was accomplished by heating the material first to 150° C., holding the material at 150° C. for 2 h, then raising the temperature to 600° C., and holding the temperature at 600° C. for 6 h. Aluminas A, B, C, and D in Table 2 were made simply by placing the lanthana-doped fine crystalline boehmites made according to Examples 1B and 1D calcining at 816° C. in the presence of 10% steam without an initial drying step at 150° C.

Example 2: Preparation of FCC Catalysts and Catalytic Performance Evaluation

Example 2A: Preparation of a NaY intermediate. A microsphere is prepared using conventional conditions. For example, a microsphere containing 40 parts of hydrous clay, 60 parts of clay is calcined beyond 1050° C. To this mixture, 8 parts of sodium silicate is added. The slurry for spray dried microspheres is formed by mixing two component slurry in a Cowles mixer. The material is spray dried with in-line injection of sodium silicate as described in patent U.S. Pat. No. 6,942,784. The microsphere is calcined at 1500° F. for 2 h before crystallization. The microsphere is crystalized for 12-16 h to form a zeolite Y by the conventional procedures, except that flash calcined gibbsite or hydrated flash calcined gibbsite is used instead of at least a part of the clay that is calcined beyond 1050° C.

Example 2B: Preparation of Catalysts. 20 kg of deionized water and 495 g of lanthanum nitrate hexahydrate were placed in a 10 gal, baffled reactor equipped with an A310 blade. The lanthanum nitrate was dissolved and the solution was heated to 50° C. 4.8 kg of flash calcined gibbsite with $d_{50}$ of about 8 microns was then added and the suspension was heated to 90° C. A 10 wt % solution of aqueous sodium carbonate (150 g anhydrous $Na_2CO_3$) was then added, and additional deionized water to bring water add to 24.0 kg. The pH was about 7.8. The suspension was heated to 99° C. and stirred for 23 h. The suspension was then cooled, washed to remove $NaNO_3$, dried, and calcined to γ-$Al_2O_3$. The calcination temperature program included a 2 h hold at 150° C. and a 6 h hold at 600° C. The alumina was suspended in deionized water to make a 25% solids suspension and milled to $d_{50}$ of 5-6 microns. Hydrous clay and clay calcined through the exotherm to contain substantial mullite was added, along with boehmite (Tor) and sodium silicate.

The slurry composition for KJ11-50 on a VF basis was $La_2O_3$-γ-$Al_2O_3$/hydrous clay/calcined clay/Tor AlOOH=50/25/13/12. The slurry was spray dried to make microspheres with $d_{50}$ of about 80 microns. The microspheres were calcined at 816° C. to convert kaolinite to metakaolin and then NaY zeolite was grown in them. Ammonium nitrate and lanthanum nitrate exchanges followed with calcination at 621° C. for 2 h, followed by another ammonium nitrate exchange to drop $Na_2O$ content to below 0.2 wt %. The catalyst was calcined again at 621° C. for 2 h and then deactivated in a fluidized bed with 100% steam at 788° C. for 24 h.

Control microspheres were made similarly but using CCA C alumina as a control alumina. CCA C is a La-doped alumina containing 4 wt % $La_2O_3$. Microsphere compositions (alumina/hydrous clay/calcined clay/Tor AlOOH) was also (50/25/13/12). The control microspheres were crystallized to NaY in the presence of either 1% relative or 12% relative extra metakaolin, added externally to the FCC microsphere. These two control catalysts were also worked up through ammonium nitrate and lanthanum nitrate exchanges, calcination, additional ammonium nitrate exchange, and a second calcination prior to deactivation at 788° C. in a fluidized bed with 100% steam for 24 h.

Example 2C: Evaluation of Lewis Acidity of Alumina for FCC Catalysts. Samples A-D were prepared using flash calcined gibbsite by dissolving lanthanum nitrate (Samples A and B) or lanthanum acetate (Samples C and D) salts in 800 g of deionized water at room temperature and heating to 50° C. The mixtures were then heated to 90° C. For samples A and C, sodium carbonate was added to adjust the pH to 9. The mixtures were then heated to 99° C. to crystallize boehmite for 24 h. The respective materials were filtered, washed to remove sodium salts, and dried. Samples A-D were then treated in a box furnace in air with 10% steam at 816° C. for 4 h. Commercial alumina materials—CCA C and CCA D (a non-doped alumina)—were also treated. Acidity was assessed by pyridine adsorption coupled with infrared spectroscopic interrogation at 180° C. to determine the "total" Lewis content and then at 400° C. to determine "strong" Lewis content in µmol/g.[2] The commercial alumina material CCA C is a $\gamma$-$Al_2O_3$ material with 4 wt % lanthanum oxide dispersed on it, and CCA D is an non-doped $\gamma$-$Al_2O_3$.

TABLE 2

| Sample | Total Lewis (µmol/g) | Strong Lewis (µmol/g) | Weaker Lewis (µmol/g) | Total Lewis wrt CCA C (%) | Strong Lewis wrt CCA C (%) | Weaker Lewis wrt CCA C(%) |
|---|---|---|---|---|---|---|
| CCA C | 446 | 110 | 336 | 100 | 100 | 100 |
| CCA D | 553 | 374 | 179 | 123 | 340 | 53 |
| A | 290 | 43 | 247 | 65 | 39 | 74 |
| B | 407 | 92 | 315 | 91 | 84 | 94 |
| C | 270 | 41 | 229 | 61 | 37 | 68 |
| D | 366 | 107 | 260 | 82 | 97 | 77 |

Table 2 provides the strong Lewis acidity content for each sample prepared as described above. Samples A and C have a strong Lewis acid content of 43 µmol/g and 41 µmol/g, respectively. Samples A and C prepared from lanthanum doped flash calcined gibbsite hydrated at pH 9 showed lower strong Lewis acid content than Samples B and D (92 µmol/g and 107 µmol/g, respectively). In addition, Samples A and C exhibited a 41% and 43% lower strong Lewis content compared to CCA C. Commercial alumina CCA C and CCA D exhibited higher strong Lewis acid content than Samples A and C.

Example 2D: Catalytic Performance Evaluation. The catalyst prepared according to Example 2B were tested in an ACE™ fixed fluidized bed reactor[1] at six different C/O ratio (weight of catalyst/weight of oil) using constant time on stream conditions. Cracking times were 60 s, and 1.2 g of gasoil feed was used. Active catalyst masses were varied after initial blending to yield constant surface area of experimental and control catalysts, and an inert diluent was used to keep mass of the charge to the ACE™ reactor constant at 9.0 g for the various cracks.

A comparison of coke at 12% bottoms is shown in Table 3. The FCC catalysts were prepared as described in Example 2B, which includes $La_2O_3$-$\gamma$-$Al_2O_3$ (KJ11-50) obtained from boehmite prepared from hydrated flash calcined gibbsite at about 99° C. at pH 9. FCC catalyst KJ11-50 exhibited 16% lower coke yield over than the control with CCA C.

TABLE 3

| Catalyst | Coke at 12% bottoms |
|---|---|
| Control with CCA C | 2.819 ± 0.051 |
| KJ11-50 | 2.355 ± 0.072 |
| Control with CCA D | 3.11 ± 0.21 |

Figure 2:
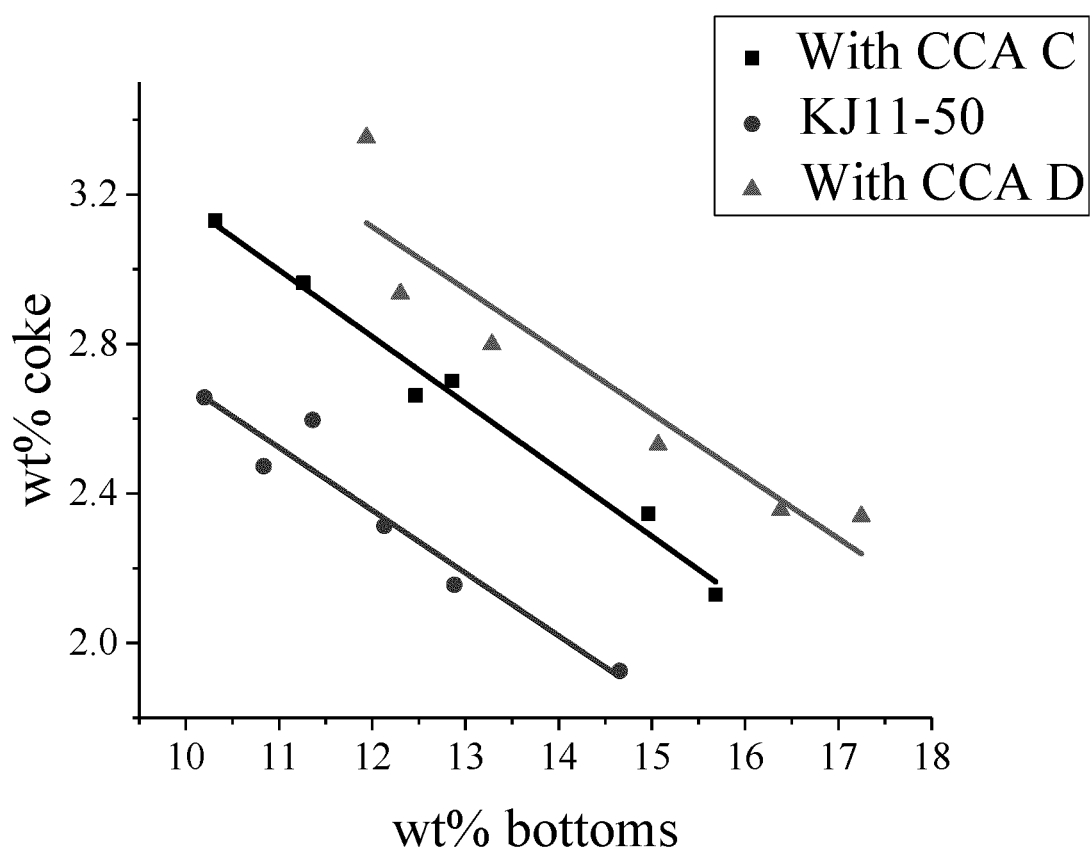
FIG. 2 illustrates the coke yield (wt %) vs. bottoms (wt %) for FCC catalyst that includes alumina derived from flash calcined gibbsite, a control catalyst using CCA C, and a control catalyst using CCA D.

The alumina used in KJ11-50 is a scale-up of Sample A, with a strong Lewis content of 43 µmol/g and shows much better coke performance than the control with CCA C and control with CCA D having the same catalyst design (FIG. 2). Without being bound by theory, the superior performance of KJ11-50 may be attributable to its decreased content of strong Lewis sites.

Figure 3:
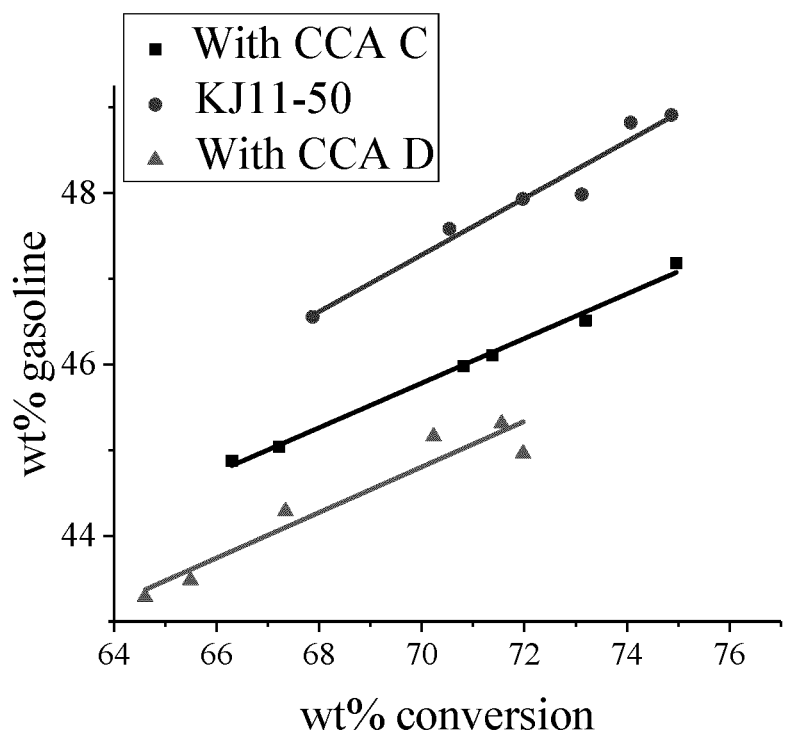
FIG. 3 illustrates the gasoline yield (wt %) vs. conversion (%) for FCC catalyst that includes alumina derived from flash calcined gibbsite, a control catalyst using CCA C, and a control catalyst using CCA D.

Since KJ11-50 showed improved coke on bottoms, it implies that this catalyst should have improved selectivity for valuable products, such as LCO, gasoline, or LPG. In FIG. 3, the gasoline yield against wt % conversion of KJ11-50, control with CCA C and control with CCA D was evaluated. Here, KJ11-50 exhibited improved gasoline yield overall (1.41±0.19%) compared to control with CCA C.

Thus, the present technology provides FCC catalysts and methods of preparing such catalysts that exhibit improved gasoline yield in addition to lower coke yields.

REFERENCES

1. Kayser, John C., U.S. Pat. No. 6,069,012.
2. Frederic Thibault-Starzyk, Barbara Gil, Sebastien Aiello, Therese Chevreau, Jean-Pierre Gilson, "In situ thermogravimetry in an infrared spectrometer: an answer to quantitative spectroscopy of adsorbed species on heterogeneous catalysts," Microporous and Mesoporous Materials, vol. 67, 107-112, 2004.
3. Gary G. Christoph, Charles E. Corbato, Douglas A. Hofmann, Rodney T. Tettenhorse, "The Crystal Structure of Boehmite, Clay and Clay Minerals, vol. 27, 81-86, 1979.
4. K. I. Shefer, S. V. Cherepanova, E. M. Moroz, E. Yu Gerasimov, S. V. Tsybulya, "Features of the real structure of pseudoboehmites: violations of the structure and layer packing caused by crystallization water", Journal of Structural Chemistry, vol. 51, 132-141, 2010.

The present invention, thus generally described, will be understood more readily by reference to the following examples, which are provided by way of illustration and are not intended to be limiting of the present invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A microspherical fluid catalytic cracking (FCC) catalyst comprising a zeolite and an alumina comprising a strong Lewis site density of less than about 70 µmol/g,
   wherein the catalyst has a phase composition comprising at least 30 wt % zeolite, and wherein the alumina further comprises about 1 wt % to about 10 wt % of a rare earth element, or bismuth, or about 1 wt % to about 10 wt % of an alkaline earth element, or a mixture of any two or more thereof.

2. The catalyst of claim 1, wherein the strong Lewis site density is less than about 40 µmol/g.

3. The catalyst of claim 1, comprising about 10 wt % to about 60 wt % of the alumina derived from flash calcined gibbsite.

4. The catalyst of claim 3, wherein the flash calcined gibbsite is hydrated flash calcined gibbsite.

5. The catalyst of claim 4, wherein the flash calcined gibbsite comprises a water content of about 2.5 wt % to about 10 wt % prior to hydration.

6. The catalyst of claim 1, wherein the alumina is formed from boehmite, bayerite, or mixture thereof, and the boehmite, bayerite, or mixture thereof is derived from hydrated flash calcined gibbsite doped with salts of lanthanum, strontium, or bismuth.

7. The catalyst of claim 1, wherein the zeolite is selected from the group consisting of zeolite X, Y-zeolite, ZSM-5, beta zeolite, ZSM-11, ZSM-14, ZSM-17, ZSM-18, ZSM-20, ZSM-31, ZSM-34, ZSM-41, ZSM-46, mordenite, chabazite, and mixtures of two or more thereof.

8. The catalyst of claim 1, wherein the phase composition further comprises at least about 30 wt % amorphous material.

9. The catalyst of claim 1, wherein the zeolite is Y-zeolite and is crystallized as a layer on the surface of a matrix, wherein the matrix comprises alumina derived from flash calcined gibbsite.

10. The catalyst of claim 1, wherein the zeolite is Y-zeolite and-is ion-exchanged to reduce the sodium content of said catalyst to less than 0.7% by weight Na2O.

11. The catalyst of claim 1, wherein the alumina comprises flash calcined gibbsite alumina.

12. A microspherical fluid catalytic cracking (FCC) catalyst comprising a zeolite and an alumina comprising a strong Lewis site density of less than about 70 µmol/g, wherein the catalyst has a phase composition comprising at least 60 wt % zeolite, and wherein the alumina further comprises about 1 wt % to about 10 wt % of a rare earth element, or bismuth, or about 1 wt % to about 10 wt % of an alkaline earth element, or a mixture of any two or more thereof.

13. A method of making a zeolitic fluid catalytic cracking catalyst, the method comprising:
   pre-forming precursor microspheres comprising a non-zeolitic material and alumina comprising a strong Lewis site density of less than 70 µmol/g; and
   in situ crystallizing a zeolite on the pre-formed microspheres to provide a zeolitic microsphere material, and
   wherein the catalyst has a phase composition comprising at least 30 wt % zeolite, wherein the alumina further comprises about 1 wt % to about 10 wt % of a rare earth element, or bismuth, or about 1 wt % to about 10 wt % of an alkaline earth element, or a mixture of any two or more thereof.

14. The method of claim 13, wherein the alumina is derived from flash calcined gibbsite.

15. The method of claim 14, wherein the in situ crystallizing comprises:
   mixing the precursor microspheres with sodium silicate, sodium hydroxide, and water to obtain an alkaline slurry; and
   heating the alkaline slurry to a temperature, and for a time, sufficient to crystallize at least about 15 wt % NaY-zeolite in the microspheres.

16. The method of claim 15, wherein at least 40% by weight Y-zeolite is crystallized in or on the pre-formed microspheres.

17. The method of claim 13, further comprising:
- separating the zeolitic microsphere material from at least a major portion of alkaline slurry;
- exchanging sodium cations in the zeolitic microsphere material with ammonium ions or ammonium ions, and thereafter rare earth ions.

18. A method of making a zeolitic fluid catalytic cracking catalyst, the method comprising:
- pre-forming precursor microspheres comprising a non-zeolitic material and alumina comprising a strong Lewis site density of less than 70 μmol/g;
- in situ crystallizing a zeolite on the pre-formed microspheres to provide a zeolitic microsphere material;
- calcining the zeolitic microsphere material;
- further exchanging the zeolitic microspheric material with ammonium ions such that the Na2O content is reduced to below 0.2%; and
- further calcining the zeolitic microspheric material,
- wherein each calcining is independently conducted for at least about two hours at a temperature of from about 500° C. to about 750° C.,
- wherein the catalyst has a phase composition comprising at least 30 wt % zeolite, wherein the alumina further comprises about 1 wt % to about 10 wt % of a rare earth element, or bismuth, or about 1 wt % to about 10 wt % of an alkaline earth element, or a mixture of any two or more thereof.

* * * * *